(No Model.) 4 Sheets—Sheet 1.

J. JOHNSON.
Lathe for Turning Handles for Table Cutlery.

No. 239,797. Patented April 5, 1881.

Witnesses:
Fred. G. Dieterich
P. C. Dieterich

Inventor:
John Johnson
by Louis Bagger & Co.
Attorneys

N. PETERS, PHOTO-LITHOGRAPHER, WASHINGTON, D. C.

(No Model.) 4 Sheets—Sheet 2.

J. JOHNSON.
Lathe for Turning Handles for Table Cutlery.

No. 239,797. Patented April 5, 1881.

Witnesses:
Fred. G. Dieterich
P. P. Dieterich

Inventor:
John Johnston
by Louis Bagger Jr
Attorneys (No Model.) 4 Sheets—Sheet 3.
J. JOHNSON.
Lathe for Turning Handles for Table Cutlery.
No. 239,797. Patented April 5, 1881.
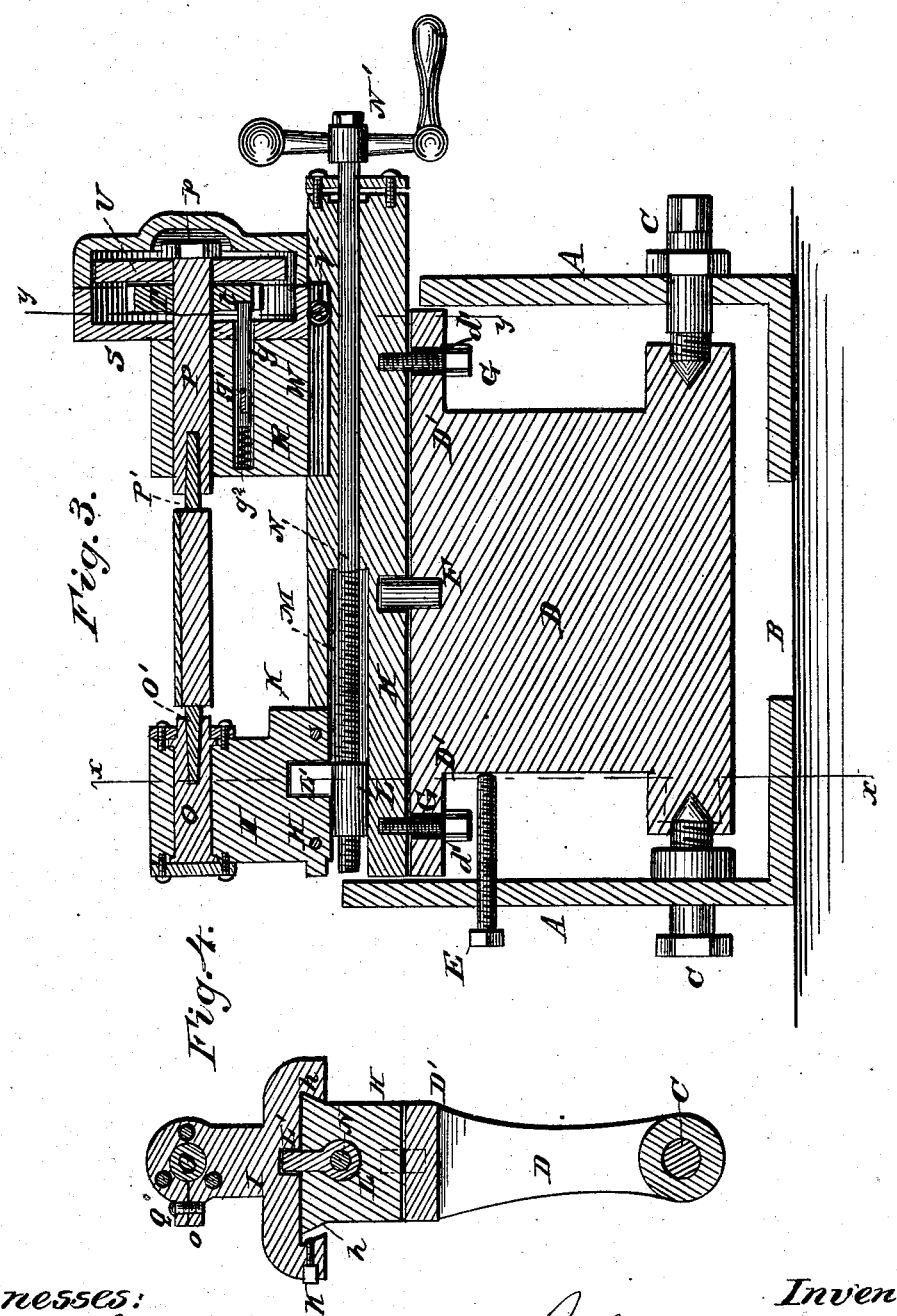
Witnesses:
Fred G. Dietrich
P. C. Dietrich
Inventor:
John Johnson
by Louis Bagger Jr.
attorneys (No Model.) 4 Sheets—Sheet 4.

J. JOHNSON.
Lathe for Turning Handles for Table Cutlery.

No. 239,797. Patented April 5, 1881.

Witnesses:
Fred. G. Dieterich
P. C. Dieterich

Inventor:
John Johnson
by Louis Bagger & Co.
attorneys

UNITED STATES PATENT OFFICE.

JOHN JOHNSON, OF SOUTH ANTRIM, NEW HAMPSHIRE.

LATHE FOR TURNING HANDLES FOR TABLE-CUTLERY.

SPECIFICATION forming part of Letters Patent No. 239,797, dated April 5, 1881.

Application filed December 24, 1880. (No model.)

*To all whom it may concern:*

Be it known that I, JOHN JOHNSON, of South Antrim, in the county of Hillsborough and State of New Hampshire, have invented certain new and useful Improvements in Lathes for Turning Handles for Table-Cutlery; and I do hereby declare that the following is a full, clear, and exact description of the invention, which will enable others skilled in the art to which it appertains to make and use the same, reference being had to the accompanying drawings, which form a part of this specification, and in which—

Figure 1:
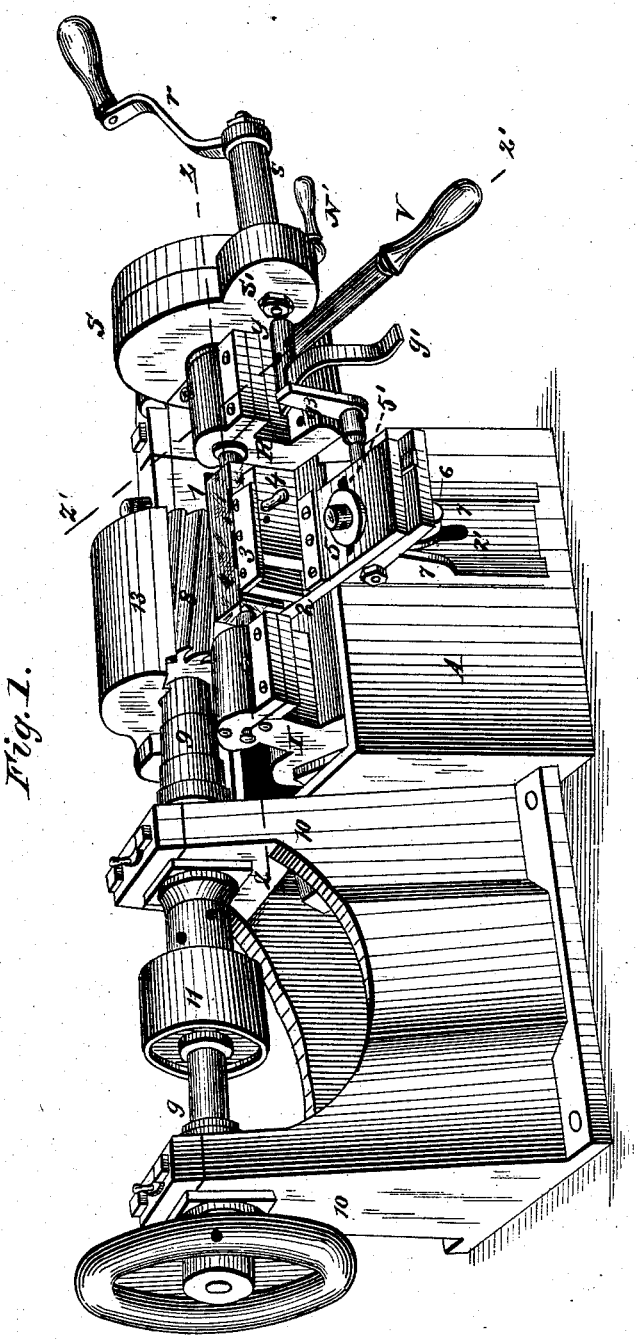
Figure 2:
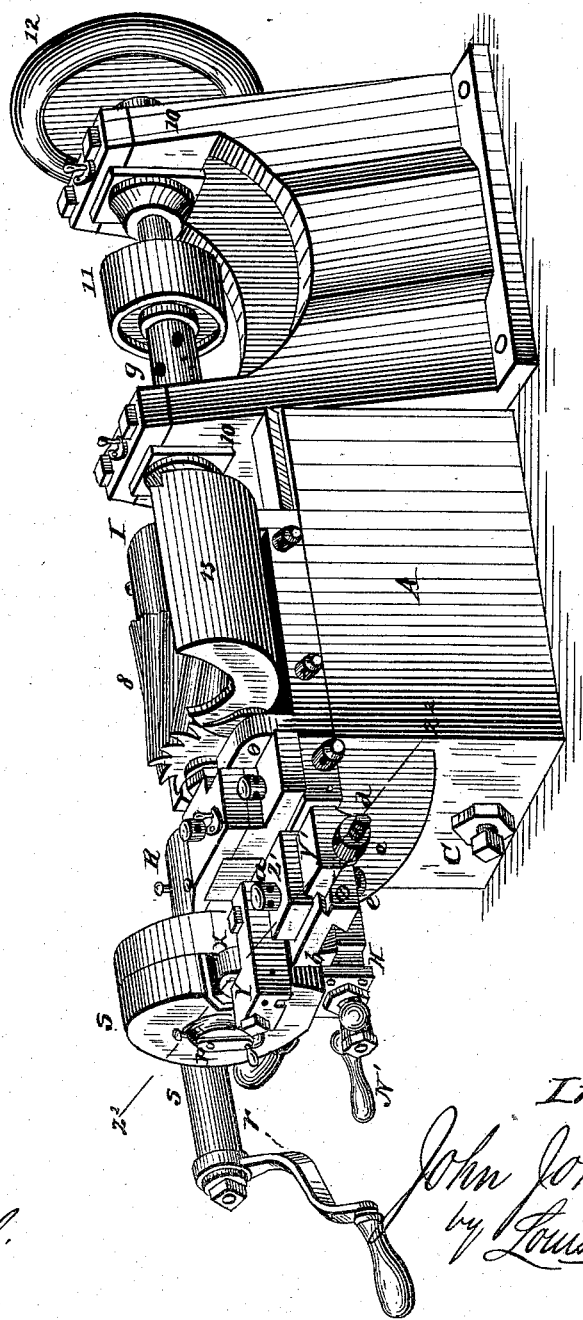
Figure 5:
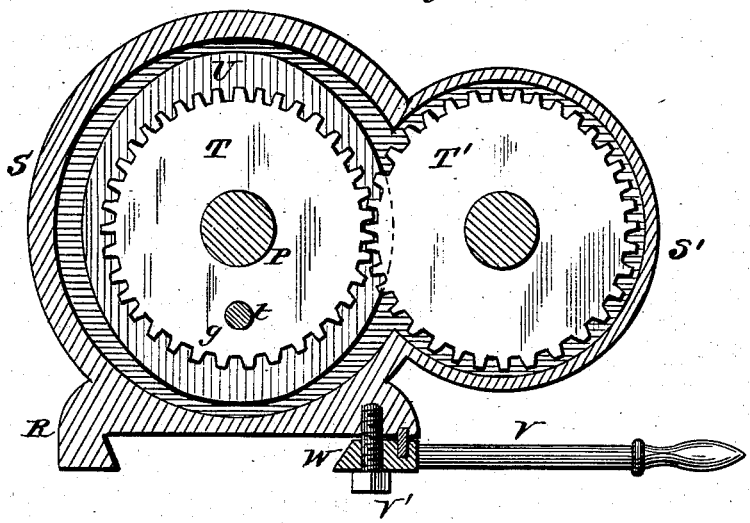
Figure 6:
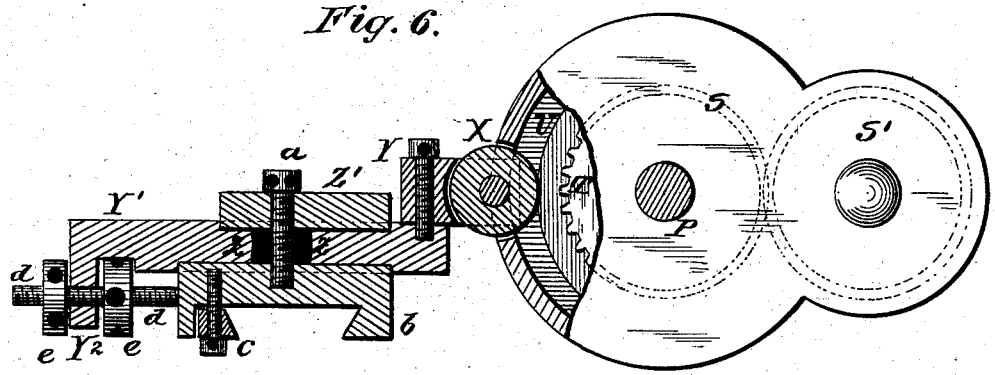
Figure 7:
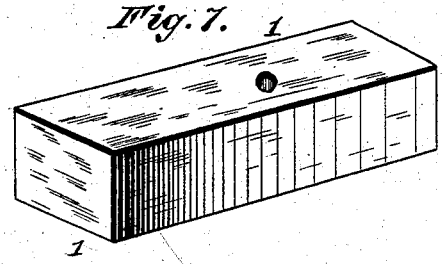
Figure 8:
Figure 9:

Figure 1 is a perspective front view of the complete machine. Fig. 2 is a perspective rear view of the same. Fig. 3 is a longitudinal vertical section through line $zz$ in Fig. 1. Fig. 4 is a transverse vertical section through line $xx$ in Fig. 3. Fig. 5 is a transverse vertical section through line $yy$ in Fig. 3 or line $z'z'$ in Fig. 1. Fig. 6 is a similar section through line $z^2 z^2$ in Fig. 2. Fig. 7 is a side view of the rough block from which the handle is cut, and Figs. 8 and 9 represent different shapes of handles cut by the machine.

Similar letters of reference indicate corresponding parts in all the figures.

My invention has relation to wood-working machines; and it consists in the construction and combination of parts of a machine for cutting handles for table-cutlery, the said machine being adapted to cut handles of different sizes, straight or curved, and with or without a taper, as desired.

In the accompanying four sheets of drawings, A designates a hollow frame or casing, made preferably of cast-iron, and having a draft hole or opening, B, in the bottom, through which the chips and shavings are drawn by a suitably-arranged exhaust-chute and suction-fan. This frame A is mounted upon a table or other support of proper size and height. In opposite ends of the frame A are inserted adjustable bolts C C, which form pivotal bearings for the swinging bed D, which may be fixed in its position within the frame or casing A by means of a set-screw, E.

The upper part of the swinging bed D is made with lateral wings or extensions D' D', one at each end, which have curved slots $d'$ to admit of the insertion through them of tightening-bolts G G, the upper ends of which are screwed into a horizontally-swinging head, H, which is pivoted upon a stud, F, inserted into the flat top of bed D, as clearly shown in Fig. 3 of the drawings. By this construction of the parts D H it follows that the latter may be adjusted upon its pivot F so as to be either parallel to D or at any desired angle within the limit of the slotted wings D', and that it may be secured in any given position upon bed D by the tightening-bolts G G.

The adjustable head H is bored through longitudinally, and the bore enlarged at one end, as shown at M, to receive a screw-threaded sliding sleeve or cylindrical bolt, L, which has a vertical stud or projection, L'.

Sleeve L may be adjusted in its bore M by means of a long screw, N, which is turned by a crank, N', at one end of the machine.

The upper part of head H has side flanges, $h\,h$, (see Fig. 4,) and forms a way for the sliding spindle-box or bearing I, which may be fixed upon head H by a set-screw, K. The bearing I is adjusted by means of screw N and its sleeve L, the stud L' of which projects up into a hole or recess in the under side of the bearing, the upper part of which forms a box for the spindle O.

The spindle-box is split, as shown at $o$, and may be tightened down upon the spindle to compensate for wear by means of a jam-screw, Q. In the inner end of spindle O is the spindle-chuck O'. Opposite to the adjustable bearing I is another fixed bearing, R, of substantially like construction, the lower part of which has a gib, W, secured by screws V'. (See Fig. 5.) Into this gib is screwed a lever-handle, V, by lifting which the bed D, with all its described appurtenances, is tilted upon the pivotal bearings C C in the bottom of frame A. The fixed (that is, fixed in relation to the part H) bearing R has a spindle, P, with a chuck, P', and a gear-wheel, T, which works inside of a metallic box or casing, S, affixed upon or cast in one piece with the bearing R. A smaller box, S', is made in one piece with box S, and contains a gear-wheel, T', which meshes with T, and is operated by a crank, $r$, the shaft of which is inserted through a tubular extension, $s$, of box S', as shown more clearly on Fig. 1 of the drawings.

Upon spindle P, (which, it will be seen, is rotated by turning crank $r$,) back of its gear-wheel T, is secured, by the spindle-nut $p$, a cam or eccentric, U, the periphery of which may be reached through a slot in the back part of box S, (see Figs. 2 and 6,) to permit of its being thrown into frictional contact (by elevating the lever-handle V) with a small wheel or roller, X, which is journaled in a block or bearing, Y, fastened upon a grooved slide-plate, Y'. This plate slides upon a dovetailed bed-piece or bearing-plate, $b$, which is secured by a wedge-shaped gib, $c$, upon an arm or bracket cast in one piece with the rigid frame or casing A. $a$ is a bolt which is secured in plate $b$, and projects up through a slot, $z$, in plate Y'. This bolt has a cap, $z'$, which covers slot $z$, to prevent the entrance of dirt and dust into the slot.

Plate Y' is flanged or dovetailed to slide upon its bearing-plate $b$, in relation to which it may be adjusted by means of adjusting-nuts $e\ e$ working upon a screw, $d$, that is secured in and projects from plate $b$, one on each side of the end flange, Y², of plate Y'.

The fixed bearing R (see Fig. 3) is recessed to contain a bolt, $g$, the rear end of which bears against a spiral spring, $g^2$, inserted into the bottom of the recess or bore. Gear-wheel T (which is secured upon the spindle P) has a recess, $t$, in its inside face, so arranged that when, in rotating the wheel, the recess $t$ is opposite the head of bolt $g$, this will, by its spring $g^2$, be projected into the recess.

A curved arm or lever, $g'$, is secured in one side of bolt $g$, at right angles thereto, and extends through a slot in bearing R outside of the machine. (See Fig. 1.) In the position of this arm $g'$ as shown in Fig. 1 wheel T is locked by the bolt $g$ projecting into its recess $t$; but by lifting arm $g'$ (bolt $g$ acting as a pivot) and slipping it over on the other side of a fixed stop, $g^3$, secured on the frame of the machine, spring $g^2$ is compressed and the bolt is withdrawn from its locking position in respect of the gear-wheel T, which is thus permitted to rotate.

The parts of my machine hereinbefore described have all relation to the means of adjusting the position of and rotating the wooden block from which the handle is to be cut. I shall now proceed to describe the parts by which the cutting and shaping is effected, reference being had in this connection to Figs. 1 and 2 of the drawings.

The block which is to form the handle (denoted by the numeral 1) is placed upon an adjustable rest, 2, having an upturned flange, 3, against which the block is placed. This flange is perforated to receive a pin, 4, which is inserted into the rivet-hole of the block (see Figs. 7, 8, and 9) to hold it in its proper place while the sliding clutch-center I is being screwed up against one end of the block.

The rest or rest-plate 2 may be adjusted with reference to the cutter laterally by a set-screw, 5, which works through a slot, 5', in the plate, and vertically by another set-screw, 6, which works through a slotted extension, 2', of the rest-plate, moving between parallel guide-flanges 7 7 upon the face of the frame or casing A. By these means the rest may be adjusted to conform to the size of handles to be cut by bringing it nearer to or farther from the cutter.

While the block is being placed in the machine preparatory to cutting, the mechanism for rotating the block is locked and prevented from moving by the spring-bolt $g$ interlocking with the recessed wheel T in the manner already described.

The cutting and shaping of the block is effected by a spiral cutter, 8, which is mounted upon a shaft, 9, having its bearings in a suitably-constructed bed, 10, and provided with a pulley, 11, and fly-wheel 12. To cut handles with straight (either parallel or tapering) sides, I employ a cylindrical spiral cutter with straight knives; but to cut rounded or swelled handles, as shown in Fig. 8, I use a concaved cutter, the swell of the handle depending, of course, upon the depth of the concave. After the block has been properly placed in the machine between the spindle-chucks O' P', the cutting and shaping is effected by lifting handle V so as to bring the eccentric U into contact with the fixed roller X, and then turning handle $r$ once around. By this operation, as the eccentric U rotates, bearing against the roller X, all that part of the machine which is supported upon the pivoted bed D will be rocked or tilted with the bed to the extent of the swell of the eccentric, and it follows that the block to be cut or shaped, following this motion, gradually recedes from and again approaches the center or axis of the cutter, (with which it is in contact all the time,) so as to be shaved off closer on two of its sides than on the other two, and be cut into an oval shape, (in cross-section,) or of greater width than thickness, with rounded corners.

I do not confine myself to any particular shape or construction of the rotary cutter 8, as cutters of different construction may be used without in the least affecting the operation of the other parts of the machine. The cutter is covered by a hinged guard, 13, which is shown in position over it in Fig. 1, but thrown back in Fig. 2.

Having thus described my invention, I claim and desire to secure by Letters Patent of the United States—

1. The frame or casing A, having opening B and adjustable pivot-bolts C C, pivoted bed-piece D, having slotted wings or extensions D' D' and central stud or pivot, F, and head-piece H, pivoted upon the stud F and having set-screws G G, constructed and combined substantially as and for the purpose herein shown and described.

2. The pivoted and adjustable head-piece H, having flanges $h\ h$ and enlarged longitudinal bore or recess M, operating-screw N, having crank N', threaded sleeve L, having vertical stud L', adjustable spindle-box or bearing I, dovetailed to fit the flanged head H, and provided with set-screw K, spindle O, and spindle-chuck O', and fixed spindle-box R, provided with the spindle P and spindle-chuck P', constructed and combined substantially as and for the purpose herein shown and specified.

3. The combination of the swinging bed D, pivoted and adjustable head H, set-screws G G, operating-screw N, threaded sleeve L, having stud L', adjustable bearing or spindle-box I, having spindle O, and fixed spindle-box R, having spindle P, substantially as set forth.

4. In combination with the pivoted and adjustable head H, constructed as described, the fixed bearing or spindle-box R, having gib W and handle V, spring-bolt $g$, having handle or lever $g'$, and spindle P, having gear-wheel T, recessed at $t$ to receive the head of bolt $g$, as and for the purpose shown and set forth.

5. The combination, with the eccentric U, of the friction-roller X, journaled in bearing Y, grooved and slotted slide-plate Y', fixed bearing-plate $b$, having screw $a$, stationary flanged cap $z'$, screw-threaded rod $d$, and adjusting-screws $e$ $e$, constructed and arranged to operate substantially as and for the purpose herein shown and described.

In testimony that I claim the foregoing as my own I have hereto affixed my signature in presence of two witnesses.

JOHN JOHNSON.

Witnesses:
JAMES C. BRACKETT,
ISAIAH G. ANTHOINE.